United States Patent Office 3,658,782
Patented Apr. 25, 1972

3,658,782
REACTIVE DISAZO TRIAZINE DYESTUFFS MADE FROM A DIAMINO DIPHENYLUREA DISULPHONIC ACID
Geoffrey Griffiths and Cecil Vivian Stead, Manchester, England, assignors to Imperial Chemical Industries Limited, London, England
No Drawing. Filed Mar. 3, 1969, Ser. No. 803,977
Claims priority, application Great Britain, Mar. 8, 1968, 11,462/68
Int. Cl. C09b 33/12, 62/08
U.S. Cl. 260—153                    4 Claims

ABSTRACT OF THE DISCLOSURE

Reactive dyestuffs represented by the formula:

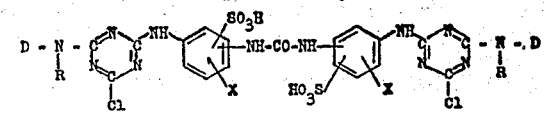

wherein R represents a hydrogen atom or an alkyl group, X is H, $CH_3$ or Cl and

represents the radical of a water-soluble coloured compound. These dyestuffs are useful as reactive dyes for colouring cellulosic textiles and give an unusually high degree of fixation during dyeing and printing processes. The dyestuffs are further characterized by their outstanding light fastness.

---

This invention relates to new reactive dyestuffs of the triazine series, useful for the colouration of cellulose textile materials.

The manufacture of reactive dyestuffs by condensing azo dyestuffs with cyanuric halides and then condensing two moles of the resulting dichloro-s-triazine derivative with a variety of diamines is described, for example, in the provisional specification of U.K. Pat. No. 854,432. The present invention is based on the observation that valuable cellulose-reactive dyestuffs can be obtained in an analogous manner by using a N,N'-diphenylurea disulphonic acid as the linking diamine.

According to the invention there are provided new reactive dyestuffs represented by the general formula:

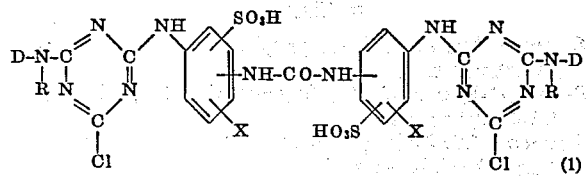

wherein R represents a hydrogen atom or an alkyl group, X is H, $CH_3$ or Cl and

represents the radical of a water-soluble coloured compound containing a —NHR group.

In the above formula, the radical D can, for example, represent the radical of a water-soluble coloured compound of the azo, anthraquinone or phthalocyanine series, e.g. a mono- or bis-azo dyestuff which may or may not be metallised.

The amino groups in the depicted benzene rings may be in meta- or para-position to each other and the $SO_3H$ group in each can be positioned in any of the remaining sites in the nucleus. It is preferred, however, in general, that the NH groups should be in para position to each other and that the sulphonic acid groups should be in ortho position to the —NHCONH— group.

Thus a preferred class of dyestuffs is that in which the linking group is a 4,4'-divalent-diphenylurea - 2,2' - disulphonic acid radical and D—NR is the radical of a phenylazopyrazolone compound containing a NHR group and a plurality of water-solubilising groups e.g. DNR represents a radical of the formula:

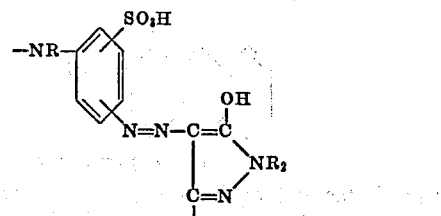

or a radical of the formula:

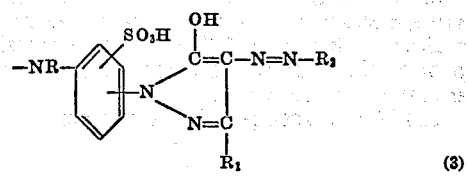

in which $R_1$ represents a methyl group or a carboxylic acid or carboxylic acid amide group, $R_2$ represents a benzene or naphthalene radical which may be substituted e.g. by Cl, $CH_3$, $OCH_3$, $NHCOCH_3$, $CO_2H$ and in particular $SO_3H$.

Such dyestuffs are distinguished by their value for use in dyeing by exhaustion methods, in which they offer a degree of fixation over a wide range of liquor-to-goods ratio not possessed by commercially-available reactive dyestuffs. At the same time, the new dyestuffs provide shades of very good light fastness, whereas previously known dyestuffs of similar structure are usually deficient in this property.

The invention also provides a process for manufacture of the new reactive dyestuffs which comprises reacting cyanuric chloride, in either order, with one molecular proportion of a water-soluble dyestuff of the formula:

D—NHR                    (4)

and with one-half molecular proportion of a diamino diphenyl-urea disulphonic acid which may contain $CH_3$ or Cl as a substituent in each benzene ring.

The above process can conveniently be carried out by stirring a suspension of the cyanuric chloride in an aqueous medium with the dyestuff of Formula 4 at a temperature of 0 to 20° C. until one chlorine atom of the cyanuric chloride has been replaced by the radical of the dyestuff, then adding the diamine and continuing reaction at a slightly higher temperature, usually in the range 30 to 50° C. until a second halogen atom on the triazine nucleus has reacted with each amino group. Alternatively, the cyanuric chloride can be reacted first with the diamine at the lower temperature to form a bis(dichlorotriazine) derivative and then with the dyestuff at the higher temperature. The condensations are preferably carried out at a pH of from 4 to 7, adding in acid-binding agent to neutralise the hydrochloric acid as it is liberated during the reaction. When reaction is complete the new reactive dyestuffs can be isolated by the usual techniques adapted for isolation of water-soluble reactive dyestuffs, for example, by salting out and filtration, or by spray-drying the reaction mixture in which the dyestuff has been formed. If desired, stabilisers, for example alkali metal hydrogen phosphates, can be added.

As examples of diaminodiphenylurea disulphonic acids which may be used, there may be mentioned 4,4'-diaminodiphenylureau-2,2'- and 3,3'-disulphonic acids, 3,3'-diaminodiphenylurea-4,4'- and 6,6'-disulphonic acids, 2,2'-dimethyl-3,3' - diaminodiphenylurea - 5,5' - disulphonic acid and 4,4'-diamino-2,2'-dichlorodiphenylurea - 6,6' - disulphonic acid.

As examples of water-soluble dyestuffs of Formula 4 which may be used, there may be mentioned the following classes:

(i) Anthraquinone compounds of the formula:

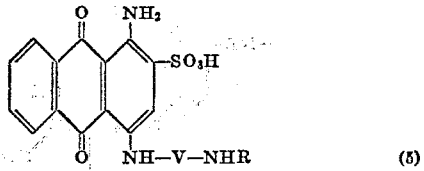

(5)

wherein the anthraquinone nucleus may contain an additional sulphonic acid group in the 5-, 6-, 7- or 8-position and V represents a bridging group which is preferably a divalent radical of the benzene series, for example phenylene, diphenylene or 4,4'-divalent stilbene or azobenzene radicals. It is preferred that V should contain one sulphonic acid group for each benzene ring present. R has the meaning stated above.

(ii) Monoazo compounds of the formula:

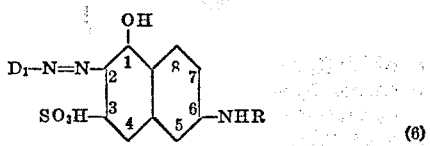

(6)

wherein $D_1$ represents a mono or di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the napthalene nucleus.

$D_1$ may represent a radical of the naphthalene or benzene series which is free from azo substituents, for example a stilbene, diphenyl, benzthiazolyl/phenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetyl-amino and alkoxy radicals such as methoxy.

(iii) Disazo compounds of Formula 6, wherein $D_1$ stands for a radical of the azobenzene, azonaphthalene or phenylazo-naphthalene series and the naphthalene nucleus is substituted by the NHR group, and optionally by sulphonic acid as in class (ii).

(iv) Mono- or dis-azo compounds of the formula:

$$D_1—N=N—D_2—NHR \qquad (7)$$

wherein $D_1$ stands for a radical as defined for class (ii) or class (iii) and $D_2$ is a 1:4-phenylene or a sulpho-1:4-naphthylene or a stilbene radical; the benzene nuclei in $D_1$ and $D_2$ may contain further substituents such as halogen atoms, or alkyl, alkoxy, carboxylic acid and acylamino groups.

(v) Mono- or dis-azo compounds of the formula:

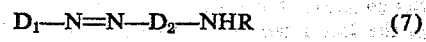

(8)

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable keto-methylene compound (such as an acetoacetarylide or a 5-pyrazolone having the —OH group o- to the azo group. $D_1$ preferably represents a radical of the benzene series containing a sulphonic acid group.

(vi) Mono- or dis-azo compounds of the formula:

$$D_1—N=N—K_2—NHR \qquad (9)$$

wherein $D_1$ represents a radical of the types defined for $D_1$ in classes (ii) and (iii) above and $K_2$ represents the radical of an enolisable ketomethylene compound such as an acetoacetarylide or a 5-pyrazolone having the —OH group in α-position to the azo group.

(vii) 1:1-metal complex, especially the copper complex, compounds of those dyes of Formulae 6, 8 and 9 (wherein $D_1$, K and $K_2$ have all the respective means stated) which contain a metallisable (for example, a hydroxy, lower alkoxy or carboxylic acid) group ortho- to the azo group in $D_1$.

(viii) Phthalocyanine compounds of the formula:

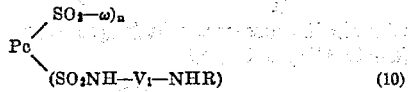

(10)

wherein Pc represents the phthalocyanine nucleus preferably of copper phthalocyanine, ω represents a hydroxy and/or a substituted or unsubstituted amino group, $V_1$ represents a bridging group, preferably an aliphatic, cycloaliphatic or aromatic bridging group, n represents 1, 2 or 3.

(ix) Nitro dyestuffs of the formula:

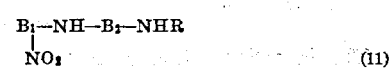

(11)

wherein $B_1$ and $B_2$ represent monocyclic aryl nuclei, the nitro group in $B_1$ being ortho to the NH group.

As examples of compounds of classes (i) to (ix) there may be mentioned the following:

In Class (i)

1-amino-4-(4'-aminoanilino)anthraquinone-2,2'-disulphonic acid,
1-amino-4-(4'-methylaminoanilino)anthraquinone-2:3'-disulphonic acid,
1-amino-4-(3'-amino-2':4':6'-trimethylanilino)anthraquinone-2,5'-disulphonic acid, In Class (ii)

6-amino-1-hydroxy-2-(2'-sulphophenylazo)naphthalene-3-sulphonic acid,
8-amino-1-hydroxy-2-(2'-sulphophenylazo)naphthalene-3:6-disulphonic acid,
7-amino-2-(2':5'-disulphophenylazo)-1-hydroxynaphthalene-3-sulphonic acid,
7-methylamino-2-(2'-sulphophenylazo)1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)naphthalene-3:6-disulphonic acid,
8-amino-1-hydroxy-2:2'-azonaphthalene-1':3:5'-6-tetrasulphonic acid,
6-amino-1-hydroxy-2-(4'-acetylamino-2'-sulphophenylazo)naphthalene-3-sulphonic acid,
6-methylamino-1-hydroxy-2-(4'-methoxy-2'-sulphophenylazo)naphthalene-3-sulphonic acid,
8-amino-1-hydroxy-2-phenylazonaphthalene-3:6-disulphonic acid,
8-amino-1-hydroxy-2:2'-azonaphthalene-1':3:6-trisulphonic acid,
6-amino-1-hydroxy-2-(4'-methoxy-2'-sulphophenylazo)naphthalene-3-sulphonic acid, 8-amino-1-hydroxy-2:2'-azonaphthalene-1':3:5'-trisulphonic acid,
6-amino-1-hydroxy-2:2'-azonaphthalene-1',3,5'-trisulphonic acid,
6-methylamino-1-hydroxy-2:2'-azonaphthalene-1':3:5'-sulphonic acid,
7-amino-1-hydroxy-2:2'-azonaphthalene-1':3-disulphonic acid,
8-amino-1-hydroxy-2-(4'-hydroxy-3'-carboxyphenylazo)naphthalene-3:6-disulphonic acid,
6-amino-1-hydroxy-2-(4'-hydroxy-3'-carboxyphenylazo)naphthalene-3:5-disulphonic acid, In Class (iii)

8-amino-1-hydroxy-2-[4'-(2''-sulphophenylazo)-2'-methoxy-5'-methylphenylazo]naphthalene-3:6-disulphonic acid,
4:4'-bis(8''-amino-1'''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:5-disulphonic acid, In Class (iv)

2-(4'-amino-2'-methylphenylazo)naphthalene-4:8-disulphonic acid,
2-(4'-amino-2'-acetylaminophenylazo)naphthalene-5:7-disulphonic acid,
2-(4'-amino-2'-ureidophenylazo)naphthalene-3:6:8-trisulphonic acid,
4-nitro-4'-(4''-methylaminophenylazo)stilbene-2:2'-disulphonic acid,
4-nitro-4'-4''-amino-2'''-methyl-5'''-methoxyphenylazo)stilbene-2:2'-disulphonic acid,
2-(4'-amino-2'-acetylaminophenylazo)-naphthalene-4:8-disulphonic acid,
4-amino-2-methylazobenzene-2':5'-disulphonic acid,
4-[4'-(2'',5''-disulphophenylazo)-2',5'-dimethylphenylazo]-1-naphthylamine-8-sulphonic acid,
4-[4'-(2'',5'',7''-trisulphonaphth-1-ylazo)-2',5'-dimethylphenylazo]-1-naphthylamine-6-sulphonic acid,
4-[4'-(2'',5'',7''-trisulphonaphth-1-ylazo)-2',5'-dimethylphenylazo]-1-naphthylamine-7-sulphonic acid,
4-[4'-(2'',5'',7''-trisulphonaphth-1-ylazo)-naphth-1-ylazo-1-naphthylamine-6-sulphonic acid,
4-[4'-(2'',5''-disulphophenylazo)-6'-sulphonaphth-1-ylazo]-1-naphthylamine-8-sulphonic acid,
4-[4'-(4''-sulphophenylazo)-2'-sulphophenylazo]-1-naphthylamine-6-sulphonic acid.

In Class (v)

1-(2',5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1''-phenyl-4''-pyrazol-5''-onyl-azo)silbene-2:2'-disulphonic acid,
4-amino-4'-(2''-hydroxy-3'',6''-disulpho-1''-naphthylazo)stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)-naphthalene-3-sulphonic acid,
8-phenylamino-1-hydroxy-2-(4'-amino-2'-sulphophenylazo)naphthalene-3:6-disulphonic acid,
6-acetylamino-1-hydroxy-2-(5'-amino-2'-sulphophenylazo)naphthalene-3-sulphonic acid,
6-ureido-1-hydroxy-2-(5'-amino-2'-sulphophenylazo)naphthalene-3-sulphonic acid,
8-benzoylamino-1-hydroxy-2-(5'-amino-2'-sulphophenylazo)naphthalene-3:6-disulphonic acid,
1-(4':8'-disulphonaphth-2'-yl)-3-methyl-4-(5''-amino-2''-sulphophenylazo)-5-pyrazolone,
1-(2'-sulphophenyl)-3-carboxy-4-(5''-amino-2''-sulphophenylazo)-5-pyrazolone,
1-(2':5'-dichloro-4'-sulphophenyl)-3-methyl-4-(5''-amino-2''-sulphophenylazo)-5-pyrazolone, In Class (vi)

1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,
1-(3'-aminophenyl)-3-carboxy-4-[4''-(2''':5'''-disulphophenylazo)-2''-methoxy-5''-methylphenylazo]-5-pyrazolone, In Class (vii)

The copper complex of 8-amino-1-hydroxy-2-(2'-hydroxy-5'1sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 8-amino-1-hydroxy-2-[4'-(2''-sulphophenylazo)-2'-methoxy-5'-methylphenylazo]naphthalene-3:6-disulphonic acid,
The copper complex of 6-amino-1-hydroxy-2-[4'-(2'':5''-disulphophenylazo)-2'-methoxy-5'-methylphenylazo]naphthalene-3, disulphonic acid,
The copper complex of 1-(3'-amino-4'-sulphophenyl)-3-methyl-4-[4''-(2''':5'''-disulphophenylazo)-2''-methoxy-5''-methylphenylazo]-5-pyrazolone,
The copper complex of 7-(4'-amino-3'-sulphoanilino)-1-hydroxy-2-[4'-(2''':5'''-disulphophenylazo)-2''-methoxy-5''-methylphenylazo]naphthalene-3-sulphonic acid,
The copper complex of 6-(4'-amino-3'-sulphoanilino)-1-hydroxy-2-(2''-carboxyphenylazo)naphthalene-3-sulphonic acid, In Class (viii)

3-(3'-amino-4'-sulphophenyl)sulphamyl copper phthalocyanine-tri-3-sulphonic acid,
4-(3'-amino-4'-sulphophenyl)sulphamyl copper phthalocyanine-tri-4-sulphonic acid,
3-(3'- or 4'-aminophenyl)sulphamyl copper phthalocyanine-3-sulphonamide-di-3-sulphonic acid, In Class (ix)

4-amino-2'-nitro-diphenylamine-3:4'-disulphonic acid.

The azo dyestuffs of the invention can also be prepared in many cases by a coupling process. Thus, by condensing cyanuric chloride with one-half mole of the diaminodiphenylurea disulphonic acid and then with one molecular proportion of an aromatic diamine, there is obtained a tetrazotisable aromatic diamine of the general formula:

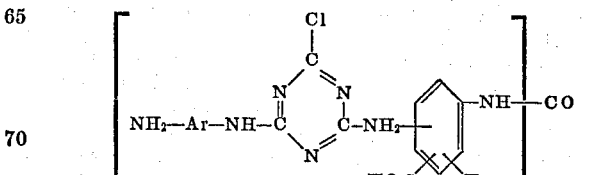

(12)

which can be tetrazotised and coupled with two moles of a coupling component, e.g. a phenol, naphthol, aminonaphthol, pyrazolone or aromatic amine.

Alternatively, the cyanuric chloride can be condensed with one-half mole of the diaminodiphenylurea disulphonic acid and then with one molecular proportion of an aromatic compound which contains an acylatable amino group and which after condensation is still capable of coupling with a diazonium compound, and coupling the resultant product with two moles of a diazotised aromatic amine.

Examples of suitable aromatic compounds useful for condensation in this connection include aminophenols, aminonaphthols and aromatic diamines.

The invention also provides a process for manufacture of the new dyestuffs in which the NR group is a substituent on a group of the formula:

(13)

present in D, $R_3$ representing H, alkyl or hydroxyalkyl and $V_2$ an alkylene, cycloalkylene, aryl or alkaryl radical which may be substituted, which comprises reacting a coloured compound having a sulphonic acid chloride group and preferably 1 or more sulphonic acid groups with one-half of one molecular proportion of a diamine of the formula:

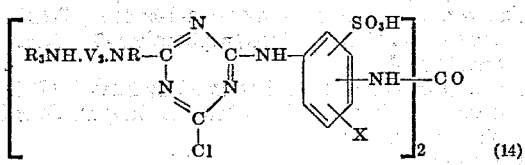

(14)

wherein R, $R_3$, $V_2$ and X have the meanings stated above.

This process can conveniently be carried out by stirring the reactants in an aqueous medium in the presence of an acid-binding agent, which, to avoid hydrolysis of the chlorine atoms on the triazine nuclei of the diamine, is preferably added at a rate which maintains the mixture at a pH of from 6 to 8. Suitable acid binding agents for this purpose include, for example, sodium hydroxide, carbonate and bicarbonate or the corresponding potassium compounds.

As examples of coloured compounds which may be used, there may be mentioned the chlorosulphonation products of copper phthalocyanine or 1,4-diarylaminoanthraquinones or the products obtained by treating azo, anthraquinone or copper phthalocyanine compounds containing sulphonic acid groups with reactants capable of converting $SO_3H$ to $SO_2Cl$ e.g. chlorosulphonic acid, thionyl chloride, phosphorus pentachloride and phosphorus trichloride.

Compounds of Formula 14 can be obtained by reacting together a diamine of the formula:

$$R_3NHV_2NHR \qquad (15)$$

wherein R, $R_3$ and $V_2$ have the meanings stated above with a bis(dichlorotriazine) derivative of a diamino diphenylurea disulphonic acid which may contain $CH_3$ or Cl as a substituent in each benzene ring.

As examples of diamines of Formula 15 there may be mentioned ethylene and hexamethylene diamines, N-β-hydroxy-ethyl-ethylene diamine, diethylene triamine, 1,4-diamino cyclohexane, m- and p-amino-benzylamines and m- and p-phenylene diamines and their mono- and di-sulphonic acids.

The new reactive dyestuffs are valuable for colouring cellulose textile materials comprising natural or regenerated cotton. For colouring such materials, the new dyestuffs are preferably applied, either by a printing but preferably a dyeing process, to the cellulose textile materials in conjunction with a treatment with an acid binding agent, e.g. caustic soda, sodium carbonate, phosphate, silicate or bicarbonate, which may be applied to the cellulose textile material before, during or after the application of the dyestuff. When so applied the new dyestuffs react with the cellulose and yield shades possessing excellent fastness to washing.

The invention may be illustrated but is not limited by the following example in which the parts are by weight:

EXAMPLE

A solution of 3.7 parts of cyanuric chloride in 30 parts of acetone is run into an ice-cold solution of 11.4 parts of the trisodium salt of 1-(4′-sulphophenyl)-3-carboxy-4-(2″-sulpho-5″-aminophenylazo)-5-pyrazolone in 200 parts of water. 20 parts of a N solution of sodium hydroxide are subsequently added to neutralise generated acidity. A solution of 4.5 parts of the disodium salt of 4,4′-diaminodiphenylurea-2,2′-disulphonic acid in 100 parts of water is added and the mixture is heated for 1½ hours at 35° C. whilst 20 parts of N sodium hydroxide solution are added to keep the solution neutral. 100 parts of potassium chloride are then added and the precipitate is filtered off and dried at 50° C.

The dyestuff so obtained is a yellow powder; on analysis it is found to contain 2.08 atoms of organically bound chlorine per molecule. When applied to cellulosic textile materials in the presence of acid-binding agents it yields greenish-yellow shades of excellent fastness to light and wet treatments.

The fixation of the above dyestuff was measured on cotton and viscose rayon materials by dyeing at 5:1 and 20:1 liquor-to-goods ratios at 80° C. as follows:

An amount of dyestuff corresponding to ½₀₀₀ mole was dissolved in water and made up to the appropriate volume for a 5:1 or 20:1 dyeing. Common salt at the rate of 60 g./l. was added and the solution was heated to 80° C. The materials (a 5 g. hank in the case of a 20:1 dyeing of cotton, piece material in the other three cases) was added and dyed for 30 minutes at 80° C. Sodium carbonate at the rate of 20 g./l. was added and dyeing was continued for one hour at 80° C. The material was removed from the dye liquor and washed in water (20:1 liquor to goods) at 80° C. for 30 minutes.

The relative amounts of dye in the fresh dye liquor, exhausted dye liquor and washing water were measured at λmax. by an absorption spectrophotometer and gave the following amounts of fixation:

| Material | Liquor to goods ratio | |
| --- | --- | --- |
| | 5:1 | 20:1 |
| Cotton, percent | 76 | 75 |
| Viscose rayon, percent | 91 | 87 |

Similar dyeings using an amount of dye corresponding to ⅙₀₀ mole and salt at the rate of 100 g./l. gave the following results:

| Material | Liquor to goods ratio | |
| --- | --- | --- |
| | 5:1 | 20:1 |
| Cotton, percent | 70 | 72 |
| Viscose rayon, percent | 90 | 81 |

Not only does this dyestuff give unusually high fixations by dyeing, but also by printing. For example fixations of 85% or greater are obtained from print pastes containing sodium carbonate, the resultant prints having excellent freedom from staining during washing treatments.

Table 1 gives further examples of dyestuffs of the invention which may be obtained when the 11.4 parts of the trisodium salt of 1-(4′-sulphophenyl)-3-carboxy-4-(2″-sulpho-5″-aminophenylazo)-5-pyrazolone used in Example 1 is replaced by the equivalent amount of the dyestuff listed in Column II of Table 1. Column III gives the shade obtained when the dyestuff is applied to cellulose textile materials in the presence of an acid binding agent.

TABLE I

| I | II | III |
|---|---|---|
| Example 2 | Trisodium salt of 2-4'-amino-2'-ureidophenyl)napthalene-3,6,8-trisulphonic acid | Yellow. |
| Example 3 | Trisodium salt of 6-(1',5'-disulphonaphth-2'-ylazo)-methylamino-5-naphthol-7-sulphonic acid | Reddish-orange. |
| Example 4 | Disodium salt of 1-(2',5'-dichloro-4'-sulphophenyl)-4-(5''-amino-2''-sulphophenylazo)-3-methyl-5-pyrazolone | Greenish-yellow. |
| Example 5 | Disodium salt of 7-phenylazo-1-amino-8-naphthol-3,6-disulphonic acid | Blue-red. |
| Example 6 | Trisodium salt of 7-(2'-sulphophenylazo)-1-amino-8-naphthol-3,6-disulphonic acid | Do. |
| Example 7 | Trisodium salt of 4-[4'(2'',5''-disulphophenylazo)-2'5'-dimethylphenylazo]-1-maphthylamine-8-sulphonic acid | Orange. |
| Example 8 | Trisodium salt of the copper complex of 7-(2'-hydroxy-3'-chloro-5'-sulphophenylazo)-1-amino-8-naphthol-3,6-disulphonic acid | Purple. |
| Example 9 | Trisodium salt of the copper complex of 6-(2'-hydroxy-3',5'-disulphophenylazo)-2-methylamino-5-naphthol-7-sulphonic acid | Rubine. |
| Example 10 | Tetrasodium salt of the copper complex of 6-(2'-hydroxy-3',5'-disulphophenylazo)-2-amino-5-naphthol-1,7-disulphonic acid | Do. |
| Example 11 | Disodium salt of 1-amino-4-(4'-aminoanilino)anthraquinone-2,3'-disulphonic acid | Greenish-blue. |
| Example 12 | Disodium salt of 1-amino-4-(4'-methylaminoanilino)anthraquinone-2,3'-disulphonic acid | Blue. |
| Example 13 | Disodium salt of 1-amino-4-(3'-aminoanilino)anthraquinone-2,4'-disulphonic acid | Do. |
| Example 14 | Disodium salt of 1-amino-4-(3'-amino-2',4',6'-trimethylanilino)anthraquinone-2,5'-disulphonic acid | Reddish-blue. |
| Example 15 | Disodium salt of 6-amino-1-hydroxy-2-(2'-sulphophenylazo)naphthalene-3-sulphonic acid | Orange. |
| Example 16 | Trisodium salt of 6-amino-1-hydroxy-2-(2',5'-disulphophenylazo)naphthaylene-3-sulphonic acid | Do. |
| Example 17 | Disodium salt of 6-methylamino-1-hydroxy-2-(2'-sulphophenylazo)naphthalene-3-sulphonic acid | Do. |
| Example 18 | Disodium salt of 7-methylamino-2-(4'-methoxy-2'-sulphophenylazo)-1-naphthol-3-sulphonic acid | Red. |
| Example 19 | Trisodium salt of 8-(3'aminobenzoylamino)-2-(2'sulphophenylazo)-1-naphthol-3,6-disulphonic acid | Blue-red. |
| Example 20 | Tetrasodium slt of 8-amino-1-hydroxy-2,2'-azonaphthalene-1',3,5',6-tetrasulphonic acid | Do. |
| Example 21 | Trisodium salt of 8-amino-1-hydroxy-2,2'-azonaphthalene-1',3,6-trisulphonic acid | Do. |
| Example 22 | Disodium salt of 6-amino-2-(4'methoxy-2'-sulphophenylzao)-1-naphthol-3-sulphonic acid | Scarlet. |
| Example 23 | Disodium salt of 6-methylamino-2-(4'-methoxy-2'-sulphophenylazo)-1-naphthol-3-sulphonic acid | Do. |
| Example 24 | Trisodium salt of 6-amino-1-hydroxy-2,2'-azonaphthalene-1',3,5'-trisulphonic acid | Reddish-orange. |
| Example 25 | Trisodium salt of 7-amino-1-hydroxy-2,2'-azonaphthalene-1',3,5'-trisulphonic acid | Red. |
| Example 26 | Tetrasodium salt of 6-amino-1-hydroxy-2,2'-azonaphthalene-1',3,5,5'-tetrasulphonic acid | Reddish-orange. |
| Example 27 | Trisodium salt of 8-amino-2-[4'-(2''-sulphophenylazo)-2'-methoxy-5'-methylphenylazo]-1-naphthol-3,6-disulphonic acid | Navy-Blue. |
| Example 28 | Disodium salt of 2-(4'-amino-2'-methylphenylazo)naphthalene-4,8-disulphonic acid | Yellow. |
| Example 29 | Disodium salt of 2-(4'-amino-2'-acetylaminophenylazo)naphthalene-5,7-disulphonic acid | Yellow. |
| Example 30 | Disodium salt of 4-nitro-4'-(4''-methylaminophenylazo)stilbene-2,2'-disulphonic acid | Yellow. |
| Example 31 | Tetrasodium salt of 4-[4'-(2'',5'',7''-trisulphonaphth-1-ylazo)-2',5'-dimethylphenylazo]-1-naphthylamine-6-sulphonic acid | Yellow-Brown. |
| Example 32 | Trisodium salt of 4-[4'-(4''-sulphophenylazo)-2'-sulphophenylazo]-1-naphthylamine-6-sulphonic acid | Orange-Brown. |
| Example 33 | Trisodium salt of 1-(4'-sulphophenyl)-3-carboxy-4-(4''-amino-3''-sulphophenylazo)-5-pyrazolone | Yellow. |
| Example 34 | Trisodium salt of 8-acetylamino-2-(3'-amino-4'-sulphophenylazo-1-naphthol-3,6-disulphonic acid | Red. |
| Example 35 | Trisodium salt of 8-phenylamino-2-(4'-amino-2'-sulphophenylazo)-1-naphthol-3,6-diIulphonic acid | Blue. |
| Example 36 | Disodium salt of 6-ureido-2-(5'-amino-2'-sulphophenylazo)-1-napthtol-3-sulphonic acid | Orange |
| Example 37 | Trisodium salt of 8-benzoylamino-2-(5'-amino-2'-sulphophenylazo)-1-naphthol-3,6-disulphonic acid | Blue-Red. |
| Example 38 | Trisodium salt of 1-(4',8'-disulphonaphth-2'-yl)-3-methyl-4-(5''-amino-2''-sulphophenylazo)-5-pyrazolone | Yellow. |
| Example 39 | Trisodium salt of 1-(2'-methyl-3'-amino-5'-sulphophenyl)-3-carboxy-4-[2''-sulphophenylazo]-5-pyrazolone | Do. |
| Example 40 | Trisodium salt of the copper complex of 6-amino-2-(2'[hydroxy-5'-sulphophenylazo)-1-naphthol-3,5-disulphonic acid | Rubine. |
| Example 41 | Trisodium salt of the copper complex of 6-methylamino-2-[4'-(2'',5''-disulphophenylazo-2'-methoxy-5'-methyl-phenylazo]-1-naphthol-3-sulphonic acid | Navy-blue. |
| Example 42 | Trisodium salt of the copper complex of 8-amino-1,2'-dihydroxy-1',2-azonaphthalene-3,4',6-trisulphonic acid | Blue. |
| Example 43 | Tetrasodium salt of the copper complex of 8-amimo-1,1'-dihydroxy-2,2'-azonaphthalene-2,4',6,8'-tetrasulphonic acid | Do. |
| Example 44 | Trisodium salt of the copper complex of 8-amino-2-(2'-hydroxy-3'-sulpho-5'-aminophenylazo)-1-naphthol-5,7-disulphonic acid; | Do. |
| Example 45 | Trisodium salt of the copper complex of 8-amino-2-(2'-hydroxy-4'-sulpho-6'-aminonaphth-1'-ylazo)-1-naphthol-5,7-disulphonic acid. | Do. |
| Example 46 | Trisodium salt of the copper complex of 6-(4'-amino-3'-sulphophenylamino)-2-(2''-hydroxy-3''-nitro-5''-sulphophenylazo)-1-naphthol-3-sulphonic acid. | Purple. |
| Example 47 | Disodium salt of 4-amino-2'-nitrodiphenylamine-3,4'-disulphonic acid | Yellow. |
| Example 48 | Pentasodium salt of 8-amino-7-(2',5'-disulphophenylazo)-2-(5''-amino-2''-sulphophenylazo)-1-naphthol-3,6-disulphonic acid | Navy-blue. |
| Example 49 | Trisodium salt of 2-amino-1-(4'-amino-2',5'-disulphophenylazo)-8-naphthol-6-sulphonic acid | Red. |
| Example 50 | Tetrasodium salt of 3-(3'-amino-4'-sulphophenyl)sulphamyl copper phthalocyanine-trisulphonic acid | Turquoise. |

EXAMPLE 51

A solution of 3.7 parts of cyanuric chloride in 30 parts of acetone is run into an ice cold solution of 4.5 parts of the disodium salt of 4,4'-diaminodiphenylurea-3,3'-disulphonic acid in 100 parts of water. 20 parts of a N solution of sodium hydroxide are subsequently added to neutralize generated acidity. A solution of 9.3 parts of the disodium salt of 2-(4'-amino-2'-methylphenylazo)naphthalene-4,8-disulphonic acid in 200 parts of water is added and the mixture stirred and heated for 20 hours at 35° C. whilst 20 parts of a N solution of sodium hydroxide are added to keep the solution neutral. 100 parts of potassium chloride are then added and the precipitate is filtered off and dried at 50° C.

The dyestuff so obtained is a yellow powder which when applied to cellulosic textile materials in the presence of acid binding agents yields yellow shades of excellent fastness to light and wet treatments.

Table 2 gives further examples of similar yellow dyestuffs of the invention which may be obtained when the 4.5 parts of 4,4'-diaminodiphenylurea-3,3'-disulphonic acid used in Example 51 is replaced by the equivalent amount of the compound listed in Column II of Table 2.

TABLE 2

| I | II. |
|---|---|
| Example 52 | 3,3'-diaminodiphenylurea-4,4'-disulphonic acid. |
| Example 53 | 3,3'-diaminodiphenylurea-6,6'-disulphonic acid. |

EXAMPLE 54

A solution of 3.7 parts of cyanuric chloride in 30 parts of acetone is run into an ice cold solution of 11.4 parts of the trisodium salt of 1-(4'-sulphophenyl)-3-carboxyl-4-(2''-sulpho-5''-aminophenylazo)-5-pyrazolone in 200 parts of water. 20 parts of a N solution of sodium hydroxide are subsequently added to neutralize generated acidity. A solution of 4.75 parts of the disodium salt of 2,2'-dimethyl-3,3'-diaminodiphenylurea-5,5'-disulphonic acid in 100 parts of water is added and the mixture is heated for 3½ hours at 35° C. whilst 20 parts of a N solution of sodium hydroxide are added to keep the solution neutral. 500 parts of potassium chloride are then added and the precipitated dyestuff filtered off and dried at 50° C.

The dyestuff so obtained is a yellow powder which, when applied to cellulosic textile materials in the presence of acid binding agents, yields greenish-yellow shades of excellent fastness to light and wet treatments.

EXAMPLE 55

A solution of 3.7 parts of cyanuric chloride in 30 parts of acetone is run into an acid cold solution of 4.5 parts of the disodium salt of 4,4'-diaminodiphenylurea-2,2'-disulphonic acid in 100 parts of water. 20 parts of a N solution of sodium hydroxide are subsequently added to neutralize generated acidity. A solution of 4.2 parts of the monosodium salt of 1,3-phenylene diamine-4-sulphonic acid in 100 parts of water is added and the mixture stirred and heated for 20 hours at 35° C. whilst 20 parts of a N solution of sodium hydroxide are added to neutralize generated acidity. The solution is then cooled to 0° C. and 25 parts of a 2 N solution of hydrochloric acid added followed by 10 parts of a 2 N solution of sodium nitrite. After 30 minutes excess nitrous acid is destroyed by the addition of sulphamic acid and a solution of 6.75 parts of the disodium salt of 1-(4'-sulphophenyl)-3-carboxy-5-pyrazolone in 100 parts of water is added. Sufficient N sodium hydroxide is added to raise to pH to 7 and after 1 hour 100 parts of potassium chloride are added and the precipitated dye is filtered off and dried at 50° C.

The yellow powder so obtained is analogous in properties to the dyestuff described in Example 1.

EXAMPLE 56

A solution of 3.7 parts of cyanuric chloride in 30 parts of acetone is run into an ice cold solution of 4.5 parts of the disodium salt of 4,4'-diaminodiphenylurea-2,2'-disulphonic acid in 100 parts of water. 20 parts of a N solution of sodium hydroxide are subsequently added to neutralize generated acidity. A solution of 5.2 parts of the monosodium salt of 2-amino-5-naphthol-7-sulphonic acid in 100 parts of water is added and the mixture stirred for 4 hours at 35° C. whilst 20 parts of a N solution of sodium hydroxide are added to neutralize generated acidity. The solution is cooled to 0° C. and a solution of the diazonium salt derived from 5.9 parts of the disodium salt of aniline-2,5-disulphonic acid in 100 parts of water is then added followed by sufficient N sodium hydroxide to raise the pH to 7. The solution is stirred for 1 hour and 100 parts of potassium chloride added. The precipitated orange dyestuff is filtered off and dried at 50° C. When applied to cellulosic textile materials in the presence of an acid binding agent it yields orange shades of excellent fastness to light and wet treatments.

We claim:

1. A reactive dyestuff represented by the formula:

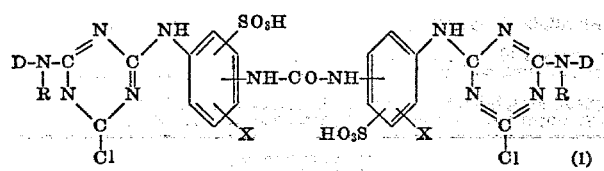
(1)

wherein R represents hydrogen or lower alkyl, X is H, $CH_3$ or Cl and $$D-N-$$
$$\quad | \quad$$
$$\quad R$$

represents the radical of a water-soluble unmetallized monoazo or 1:1 copper complex monoazo compound having the NR group attached to a carbon atom thereof, DNR being selected from the group consisting of:

(a)
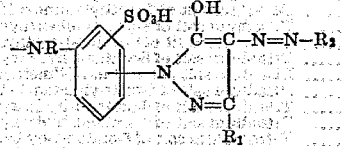

wherein $D_1$ is phenyl, 2-sulphophenyl, 4-methoxy-2-sulphophenyl, 2,5-disulphophenyl, 1-sulphonaphth-2-yl, and 1,5-disulphonaphth-2-yl;

(b) 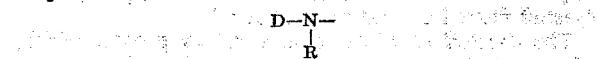

wherein $D_2$ is di- or tri-sulphonaphthyl; and $D_3$ is 1,4-phenylene substituted by $CH_3$, $CH_3CONH$— or $NH_2CONH$—

(c)
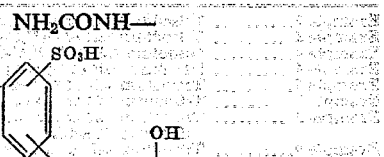

or a radical of the formula:

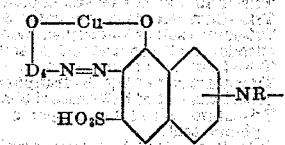

in which $R_1$ represents $CH_3$, $CO_2H$ or $CONH_2$ and $R_2$ represents a benzene or naphthalene nucleus which is unsubstituted or substituted by from 1 to 3 substituents selected from Cl, $CH_3$, $OCH_3$, $NHCOCH_3$, $CO_2H$ and $SO_3H$;

(d)
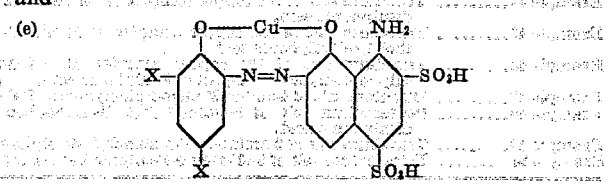

wherein $D_4$ is sulpho-1,2-phenylene as such or substituted by Cl or $SO_3H$ or mono- or di-sulpho-1,2-naphthylene; and (e)
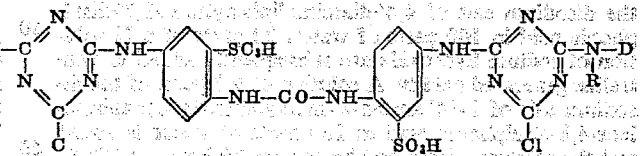

wherein one X is —NH— and the other is $SO_3H$.

2. A dyestuff as claimed in claim 1 of the formula:

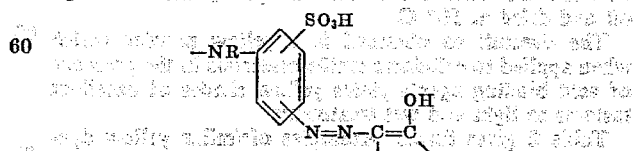

3. A dyestuff as claimed in claim 1 wherein D—NR— represents a radical of the formula:

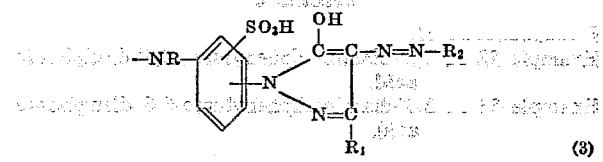
(2)

or a radical of the formula:

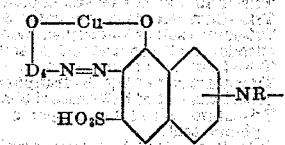
(3)

in which $R_1$ represents $CH_3$, $CO_2H$ or $CONH_2$ and $R_2$ represents a benzene or naphthalene nucleus which is unsubstituted or substituted by from 1 to 3 substituents selected from Cl, $CH_3$, $OCH_3$, $NHCOCH_3$, $CO_2H$ and $SO_3H$.

4. The dyestuff of the formula:

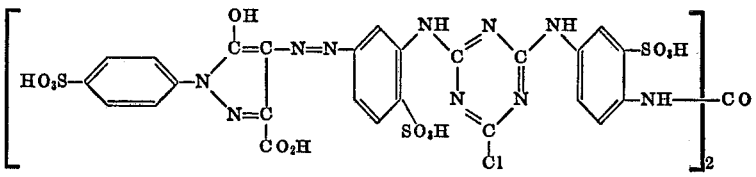

References Cited

UNITED STATES PATENTS

| | | | |
|---|---|---|---|
| 3,027,361 | 3/1962 | Starn | 260—153 |
| 3,108,846 | 10/1963 | Utsunomiya et al. | 260—153 X |
| 3,362,948 | 1/1968 | Andrew et al. | 260—153 X |
| 3,474,084 | 10/1969 | Griffiths et al. | 260—153 |
| 3,497,494 | 2/1970 | Budziarek | 260—153 |
| 3,502,644 | 3/1970 | Nickel et al. | 260—153 X |

FLOYD D. HIGEL, Primary Examiner

U.S. Cl. X.R.

260—146 T, 147, 151, 162, 163, 191, 196, 198, 199, 249.8, 314.5, 371, 374, 510, 553 C